United States Patent
Vemulapalli

(10) Patent No.: US 9,942,723 B2
(45) Date of Patent: Apr. 10, 2018

(54) LOCATION AND DIRECTION SYSTEM FOR BUILDINGS

(71) Applicant: Ravi Vemulapalli, Clive, IA (US)

(72) Inventor: Ravi Vemulapalli, Clive, IA (US)

(*) Notice: Subject to any disclaimer, the term of this patent is extended or adjusted under 35 U.S.C. 154(b) by 37 days.

(21) Appl. No.: 14/094,248

(22) Filed: Dec. 2, 2013

(65) Prior Publication Data

US 2015/0156612 A1 Jun. 4, 2015

(51) Int. Cl.
*H04W 4/04* (2009.01)

(52) U.S. Cl.
CPC .................. *H04W 4/043* (2013.01)

(58) Field of Classification Search
CPC ..................................... H04W 4/043
USPC ............................... 455/456.1–457
See application file for complete search history.

(56) References Cited

U.S. PATENT DOCUMENTS

| | | | |
|---|---|---|---|
| 4,814,751 A | 3/1989 | Hawkins et al. | |
| 5,760,704 A | 6/1998 | Barton et al. | |
| 6,424,264 B1 * | 7/2002 | Giraldin et al. | 340/573.1 |
| 6,600,915 B1 * | 7/2003 | Wedeking | 455/410 |
| 7,035,650 B1 * | 4/2006 | Moskowitz | G01S 5/0247 340/995.23 |
| 7,693,727 B2 | 4/2010 | Moore | |
| 2003/0060978 A1 * | 3/2003 | Kokojima | G01C 21/20 701/434 |
| 2003/0229444 A1 * | 12/2003 | Bullock et al. | 701/202 |
| 2004/0019501 A1 | 1/2004 | White et al. | |
| 2004/0192353 A1 * | 9/2004 | Mason et al. | 455/457 |
| 2004/0203391 A1 * | 10/2004 | Hoshina | G01S 1/68 455/41.2 |
| 2006/0049936 A1 * | 3/2006 | Collins et al. | 340/539.11 |
| 2006/0290519 A1 * | 12/2006 | Boate et al. | 340/573.4 |
| 2009/0170529 A1 * | 7/2009 | Kane | 455/456.3 |
| 2010/0097269 A1 * | 4/2010 | Loidl | G01S 5/0252 342/378 |
| 2011/0074585 A1 | 3/2011 | Harmon et al. | |
| 2011/0140861 A1 * | 6/2011 | Amir | G01S 13/825 340/10.3 |
| 2011/0211563 A1 * | 9/2011 | Herrala et al. | 370/338 |
| 2012/0025985 A1 | 2/2012 | Bolander et al. | |
| 2013/0147621 A1 * | 6/2013 | Kwong | 340/521 |
| 2013/0190016 A1 * | 7/2013 | Krishnakumar et al. | 455/456.3 |

* cited by examiner

*Primary Examiner* — Marisol Figueroa
(74) *Attorney, Agent, or Firm* — Zarley Law Firm, P.L.C.

(57) ABSTRACT

A tracking system for locating individuals and equipment as well as providing directions within a building includes a plurality of transmitters that are positioned and associated with specific locations within the building. The location of the transmitters is stored in a database of a controller. An individual is provided with a receiver that detects signals sent by the transmitters. Each receiver has an identification code associated with the individual that is stored within the controller's database. The receiver forwards detected information on to the controller and based upon the information, the controller displays an icon associated with the receiver on a grid of the building that shows the location of the individual within the building.

7 Claims, 1 Drawing Sheet

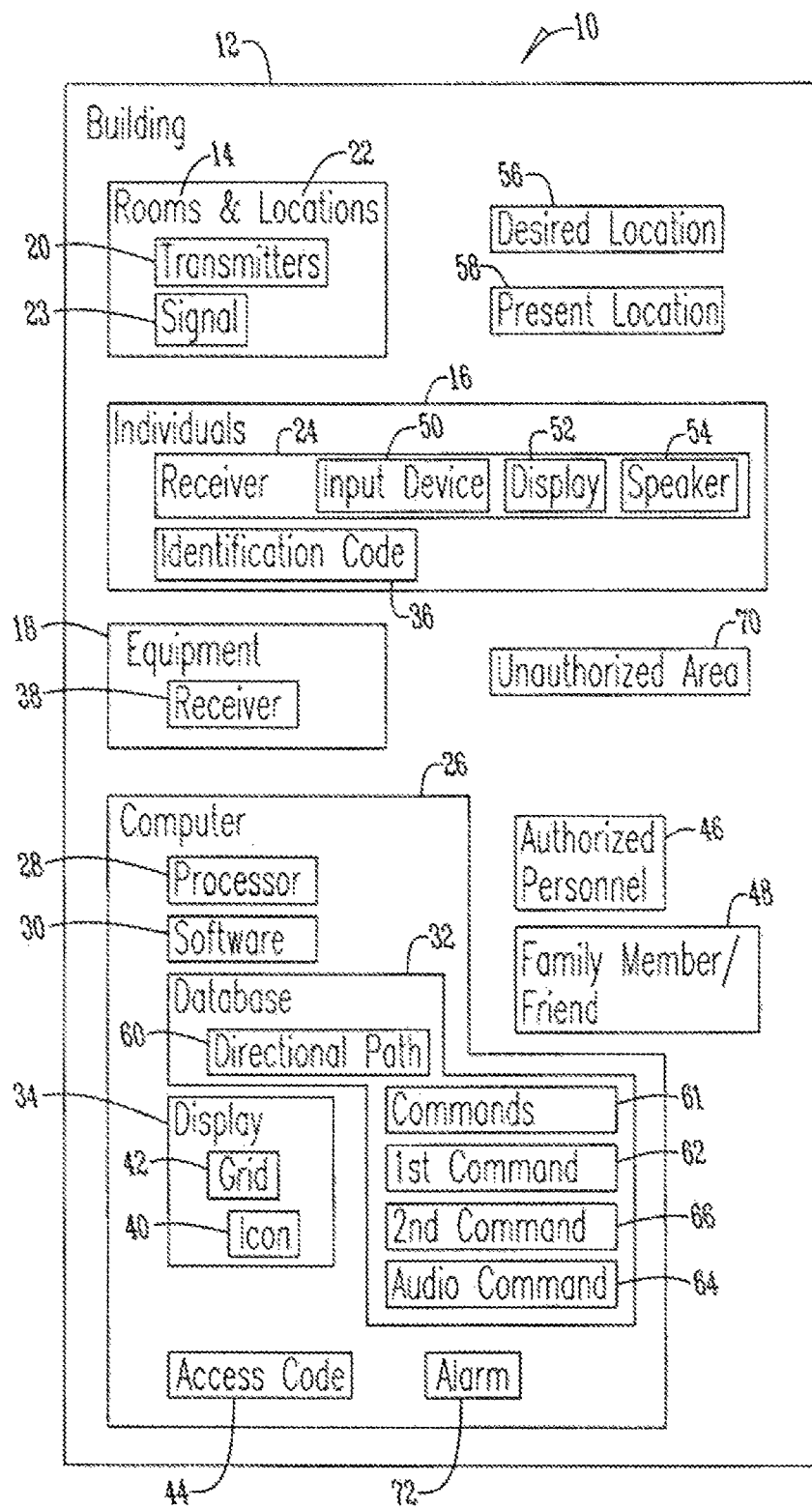

LOCATION AND DIRECTION SYSTEM FOR BUILDINGS

BACKGROUND OF THE INVENTION

This invention is directed to a location and direction system and more particularly for a location and direction system used within large complex buildings.

Systems for tracking the location of individuals and things, as well as providing directions, are known in the art. Many of these systems rely upon global positioning systems or GPS. While useful, these systems do not work within buildings as the satellite signal cannot be detected. Other systems, used within buildings require inputting information through a manual input or multiple scanning. While helpful, there still exists a need in the art that improves upon tracking locations and providing directions within buildings.

Therefore, an objective of the present invention is to provide a tracking system that is easy to use and requires little manual involvement.

Another objective of the present invention is to provide a location tracking and direction system that is used within buildings.

These and other objectives will be apparent to one of ordinary skill in the art based upon the following written description, drawings, and claims.

SUMMARY OF THE INVENTION

A tracking system for locating individuals and equipment as well as providing directions within a building includes a plurality of transmitters that are positioned and associated with specific locations within the building. The location of the transmitters is stored in a database of a controller.

An individual is provided with a receiver that detects signals sent by the transmitters. Each receiver has an identification code associated with the individual that is stored within the controller's database. The receiver forwards detected information on to the controller and based upon the information, the controller displays an icon associated with the receiver on a grid of the building that shows the location of the individual within the building.

The controller also provides displayed and audio commands to a display and speaker on the receiver that correspond to a directional path. The directional path is determined by the controller based upon a present location and an inputted desired location.

BRIEF DESCRIPTION OF THE FIGURE

FIG. 1 is a schematic view of an environment for a location and direction system for a building.

DETAILED DESCRIPTION OF THE PREFERRED EMBODIMENTS

Referring to the FIGURE, a location and direction system 10 is used within large complex buildings 12 having numerous rooms 14 to track and locate individuals 16 and equipment 18 as well as provide directions for the individuals 16. The system 10 includes a plurality of transmitters 20 positioned throughout the building 12 and associated with a particular room 14 or location 22. The signal 23 emitted by the transmitter 20 is preferably unique to the building 12.

An individual 16 is provided with a receiver 24 that detects signals from the transmitters 20. The receiver 24 is of any form such as a wristband, badge, or other device and is connected to a computer 26. The computer 26 includes a processor 28, software 30, a database 32, and a display 34. Each receiver 24 is provided with an identification code (i.e., individual's name or number 36, which is stored in the database 32 of the computer 26.

Also, receivers 38 are attached to various pieces of equipment 18 and likewise are assigned a name or number 36. In operation the receivers 24 and 38 detect signals sent from transmitters 20. The detected signal is forwarded to the computer 26 and the software 30 determines the identity of the transmitter 20, determines the associated room 14 or location 22 of the transmitter 20, and based upon the detected signal displays an icon 40 representing the individual 16 or equipment 18 on a grid 42 that corresponds with the layout of the building 12. In one embodiment, the display 34 is limited to authorized personnel through use of a password or access code 44. If more than one signal 23 is detected, the computer 26 determines which signal 23 is stronger and displays the related icon 40.

As an example, when a patient 16 is admitted to a hospital 12, the patient is presented with a wristband having a receiver 24. The wristband has an identification number 36 that is stored in the database of the computer 26. As the patient 16 is moved from different rooms 14 within the hospital 12, the receiver 24 detects signals 23 transmitted from a transmitter 20 associated with a room 14 or location 22. Once signal 23 is detected the receiver 24 sends a signal to the computer 26. Based upon the signal received, the computer identifies the transmitter 20, associates with the receiver 24, and shows the identification number 36 on the display 34 on the grid 42 of the building 12. Authorized personnel 46 and/or family members 48 may view the display 34 to track the location of the patient 16 with or without the use of an access code 44 depending upon the circumstances.

For directions, the receiver 24 has an input device 50, a display 52, and a speaker 54. The desired location 56 and present location 58 are input into the receiver 24. Based upon the input locations 56 and 58, the software 30 accesses a directional path 60 from the database 32 which are then shown on the display 52. Preferably, the directional path 60 is comprised of multiple commands 61 where only the first command 62 is displayed which is accompanied by an audio command 64. As the individual 16 follows the first commands 62 and 64, the receiver 24 detects signals 23 from transmitters 20 and the computer 26 determines which transmitter 20 is the closest to the receiver 24. The computer 26 then compares the closest detected signal 23 with the transmitters 20 on the directional path 60. When the individual reaches a transmitter 20 associated with a second command 66 the computer 26 displays the second command 66 preferably associated with a second audio command 64. This process is repeated until the individual reaches the desired location 56.

If the individual 16 moves away from instead of toward the transmitter 20 associated with the second command 66, the computer 26 either accesses a new directional path 60 or sends a signal advising the individual 16 that they are going the wrong direction. Also, if the individual 16 enters an unauthorized area 70, the computer activates an alarm 72 that is sent to authorized personnel 48 and/or the individual 16.

Thus a location and direction system has been disclosed that at the very least meets all the stated objectives.

What is claimed is:
1. A tracking system, comprising:
a building having a plurality of rooms;

a plurality of transmitters positioned throughout the building and associated with a particular location within the building;

a receiver used by an individual and having an input device, a display, and a speaker; and a controller having software that accesses a stored directional path based upon a present location and input desired location wherein the controller transmits commands to the receiver based on a signal detected by the receiver that the controller determines is strongest.

2. The system of claim 1 wherein the command is displayed and accompanied by an audio command.

3. The system of claim 2 wherein the controller transmits additional commands based upon a closest detected signal from one of the transmitters.

4. The system of claim 1 wherein the controller activates an alarm when a signal from one of the transmitters detects that the individual has entered an unauthorized area.

5. A tracking system, comprising:

a building having a plurality of rooms;

a plurality of transmitters positioned throughout the building and associated with a particular location within the building;

a receiver used by an individual and having an input device, a display, and a speaker; and a controller having software that accesses a stored directional path based upon a present location and input desired location wherein a computer compares detected signals from the transmitters with transmitters on the directional path and displays on the computer a command when the individual reaches a transmitter associated with the command.

6. The system of claim 5 wherein the directional path is comprised of multiple commands where only the first command is displayed.

7. The system of claim 5 wherein the computer accesses a new directional path and advises the individual they are going the wrong way when the individual moves away from instead of toward a transmitter associated with a subsequent command.

* * * * *